F. H. ROYCE.
REDUCTION GEAR.
APPLICATION FILED DEC. 27, 1917.
1,286,788.
Patented Dec. 3, 1918.
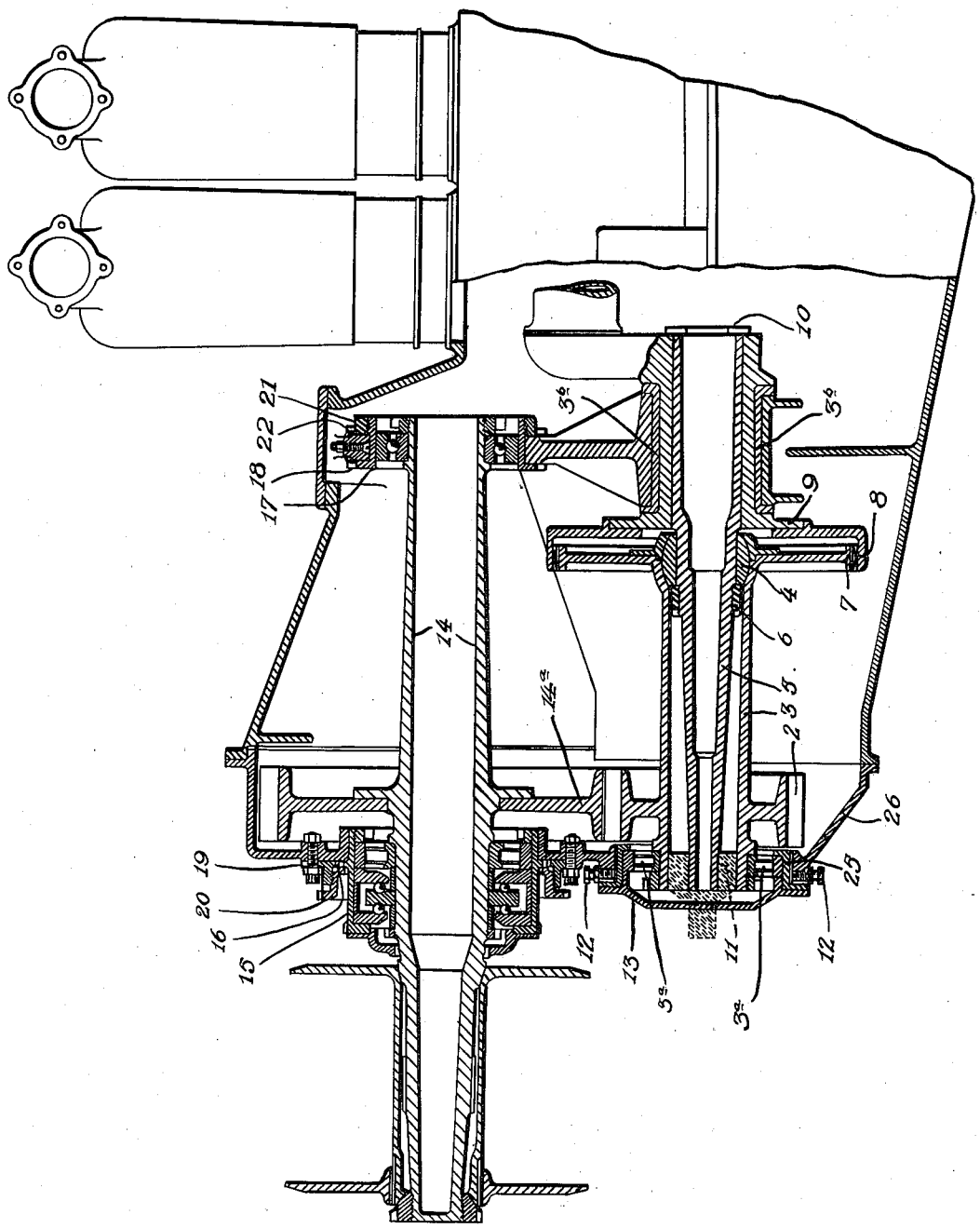
Inventor:
Fredrick Henry Royce
by his Attorney

UNITED STATES PATENT OFFICE.

FREDERICK HENRY ROYCE, OF DERBY, ENGLAND, ASSIGNOR TO ROLLS-ROYCE LIMITED, OF DERBY, ENGLAND.

REDUCTION-GEAR.

1,286,788.          Specification of Letters Patent.          Patented Dec. 3, 1918.

Application filed December 27, 1917. Serial No. 209,109.

*To all whom it may concern:*

Be it known that I, FREDERICK HENRY ROYCE, of Derby, England, have invented certain new and useful Improvements in Reduction-Gears, of which the following is a specification.

The present invention relates to improved means for mounting and driving gear shafts, more especially those of spur reduction gears interposed between the engine and the propeller on air craft motors. The invention may also be used for geared turbines, and the like.

The objects of the invention are:—Firstly, to provide flexible driving means between the crank-shaft or motor power shaft and the gearing, and convenient means for alining the driving means. Secondly, to reduce the load thrown on the end bearing of the power shaft, and also the bending stresses on the power shaft, due to the torque reaction of the gearing.

The objects of the invention are attained by driving the gear pinion of the crankshaft or motor power shaft through a flexible coupling, by mounting the pinion in such a position that a bearing on the outside takes the larger portion of the load due to the torque reaction of the gear, and by providing a radial adjustment for the said outer bearing as well as a radial adjustment for the bearings of the secondary or propeller shaft.

In order to facilitate the alinement of the crank-shaft gear pinion, an extension piece is arranged on the crankshaft which passes through the hollow pinion shaft in such a manner that an annular space is left between the said extension piece and the hollow shaft into which a gage or test piece may be inserted.

The accompanying drawing illustrates a method of carrying out the invention, the drawing being a part sectional elevation of the reduction gear as fitted between the propeller and the engine of an aircraft motor.

The crankshaft gear pinion 2 is mounted on or made integral with the hollow shaft 3, which is provided with a roller bearing $3^a$ at its outer end, that is, at its end remote from the crankshaft. The load due to the torque reaction is divided between the said bearing and the end bearing $3^b$ of the crankshaft; the said bearing $3^a$ takes the greater part thereof, owing to its closer proximity to the pinion. The inner end of the hollow shaft 3 is supported on a spherical seating formed by a ring 4 mounted on the crankshaft extension piece 5, and secured by a nut 6. The pinion shaft 3 is driven at the same speed as the crankshaft by means of a flexible coupling joint which permits a small amount of relative angular movement about the center of the said spherical seating ring. In the accompanying drawing the flexible coupling shown comprises an externally toothed disk 7 fixed to the pinion shaft 3, and an internally toothed ring 8 fixed to the flange 9 integral with the crankshaft. The teeth on the said disk and ring are equal in number, and they engage loosely. Any other equivalent form of flexible coupling may be employed. The said flexible coupling is only arranged to take up minute inaccuracies in the lining up of the pinion with the crankshaft, and under normal conditions a very small amount of movement takes place. Under exceptional conditions, however, due to accident or careless handling, the pinion may be considerably out of line, in which case the flexible coupling protects the crankshaft from the heavy bending stresses it would otherwise be called upon to bear.

The crankshaft extension piece 5 fits in a hole (which may be tapered) drilled coaxially with the crankshaft, and is held in position by the nut 10. This extension piece passes through the hollow pinion shaft 3 forming therewith at the outer ends an annular space into which a gage or test piece 11 may be arranged to fit. To adjust the end bearing so that the test piece is quite free to float, a radial adjustment for the end housing 25 is provided. For this purpose, four equally spaced set-screws 12 are arranged around the housing, and provide for any adjustment required; sufficient annular clearance being provided between the housing 25 and the end cover 26 of the gear casing, and also between the fastening studs (not shown on the drawing) and the holes in the flange of the housing 25.

To aline the gear, the following is the procedure:—Ease off all the set screws 12, remove the cover 13, and insert the test piece 11. This may be done although the gear may be out of line, as the extension piece 5 is made sufficiently flexible to bend or accommodate itself, but as the test piece under these conditions will be pressed at one side between the hollow shaft 3 and the extension piece 5 any mis-alinement is easily detected. The gearing may be set in motion while testing for alinement, and the test piece held while the engine is running. If it is then impossible to hold the test piece and prevent it from turning, the housing requires further radial adjustment. In practice it will be found necessary to adjust this end bearing each time the crankshaft is rebedded.

In order to maintain the correct meshing of the pinion 2 with the gear wheel 14ª on the propeller shaft 14, the latter is provided with eccentric bearing housings 15 and 17 which permit of accurate adjustment of the gear centers. It is to be observed that the eccentricity required (that is, the variation of thickness of the shells of the eccentric housings) is small, and that the drawing shows the shaft 14 at its mean distance from the crankshaft, and therefore shows the diametral section of the eccentric housings where the thicknesses are equal. When this means of adjusting the shaft 14 is adopted, it is extremely important that each eccentric bush or housing be moved exactly the same amount in the same direction, and for this purpose the housing 15 is provided with serrations 16, and the housing 17 with serrations 18, each of these serrations being suitably marked so that when the adjustment is being made, the angular movement can easily be determined. In each case these serrations may be used to prevent the bush from rotating after the correct position has been found. For this purpose, a ring 19 is bolted to the gear box or casing, the said ring being provided with serrations which engage with the serrations 16. A nut 20 is screwed into the ring 19, for the purpose of locking the housing axially. In the case of the inner bearing the nut 21 provided with serrations corresponding to the serrations 18 is screwed on to the housing 17, and both are locked by suitably shaped plates 22.

What I claim as my invention and desire to secure by Letters Patent of the United States is:—

1. A reduction gear comprising a motive power shaft, a hollow shaft, a driving pinion carried by said hollow shaft normally coaxial with said motive power shaft, flexible driving means between the motive power shaft and the said hollow shaft, an outer bearing for the hollow shaft and means for radially adjusting said outer bearing.

2. In a reduction gear, the combination of a crank shaft, an extension piece on said shaft, a hollow shaft normally coaxial with the said extension piece, a driving pinion on said hollow shaft, a spherical seating between the said extension piece and hollow shaft, a flexible coupling between the crank shaft and hollow shaft, and a radially adjustable bearing at the outer end of the hollow shaft.

3. A reduction gear comprising a motive power shaft, a hollow shaft, a driving pinion carried by said hollow shaft normally coaxial with said motive power shaft, flexible driving means between the motive power shaft and the said hollow shaft, an outer bearing for the hollow shaft, means for radially adjusting said outer bearing, a secondary or driven shaft geared to said driving pinion and means for mounting same which permit of adjustment of the distance between the said shaft and the aforesaid hollow shaft.

4. A reduction gear comprising a motive power shaft, a hollow shaft, a driving pinion carried by said hollow shaft normally coaxial with said motive power shaft, flexible driving means between the motive power shaft and the said hollow shaft, an outer bearing for the hollow shaft, means for radially adjusting said outer bearing, a flexible extension piece on the motive power shaft and a hollow gage or test piece for determining the alinement of the hollow shaft with the motive power shaft.

5. A reduction gear comprising in combination a crank shaft, an extension piece on said shaft, a hollow shaft normally coaxial with said extension piece, a driving pinion on said hollow shaft, a spherical seating between the said extension piece and the hollow shaft, a flexible coupling between the crank shaft and hollow shaft, a radially adjustable bearing at the outer end of the hollow shaft, a flexible extension piece on the crank shaft, a hollow gage or test piece for determining the alinement of the hollow shaft with the crank shaft, a secondary or driven shaft geared to said driving pinion and means for mounting same adapted to permit of adjustment of the distance between said secondary shaft and the aforesaid hollow shaft.

In witness whereof I have signed this specification in the presence of two witnesses.

FREDERICK HENRY ROYCE.

Witnesses:
H. R. CUTTEN,
F. PARSONS.